(12) United States Patent
Ono et al.

(10) Patent No.: US 11,574,160 B2
(45) Date of Patent: Feb. 7, 2023

(54) NON-CONTACT COMMUNICATION MEDIUM, DRIVING METHOD THEREFOR, AND RECORDING MEDIUM CARTRIDGE

(71) Applicant: Sony Semiconductor Solutions Corporation, Kanagawa (JP)

(72) Inventors: Kazutoshi Ono, Fukuoka (JP); Toru Terashima, Kanagawa (JP); Hiroaki Fujita, Kanagawa (JP); Hiroaki Nakano, Tokyo (JP); Hideo Maeda, Fukuoka (JP); Nobuhiko Shigyo, Fukuoka (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 36 days.

(21) Appl. No.: 16/977,958

(22) PCT Filed: Mar. 19, 2019

(86) PCT No.: PCT/JP2019/011397
§ 371 (c)(1),
(2) Date: Sep. 3, 2020

(87) PCT Pub. No.: WO2019/198438
PCT Pub. Date: Oct. 17, 2019

(65) Prior Publication Data
US 2021/0012174 A1    Jan. 14, 2021

(30) Foreign Application Priority Data
Apr. 9, 2018 (JP) .............................. JP2018-074696

(51) Int. Cl.
G06K 19/07 (2006.01)
H02J 50/12 (2016.01)
(Continued)

(52) U.S. Cl.
CPC ...... *G06K 19/0726* (2013.01); *G11B 5/00813* (2013.01); *G11B 23/087* (2013.01); *H02J 50/12* (2016.02)

(58) Field of Classification Search
CPC . G06K 19/0726; H02J 50/12; G11B 5/00813; G11B 23/087
See application file for complete search history.

(56) References Cited

U.S. PATENT DOCUMENTS 6,321,067 B1 * 11/2001 Suga .................. G06K 19/0701
455/41.2
9,396,754 B1 * 7/2016 Wong ................. G11B 15/6835

FOREIGN PATENT DOCUMENTS

EP        0829940 A2   3/1998
EP        2827469 A1   1/2015
(Continued)

OTHER PUBLICATIONS

Extended European Search Report dated Apr. 15, 2021 for corresponding European Application No. 19784778.3.

*Primary Examiner* — Laura A Gudorf
(74) *Attorney, Agent, or Firm* — Micheal Best & Friedrich LLP

(57) ABSTRACT

A non-contact communication medium according to one disclosed embodiment includes a memory unit, a power generation unit, a power monitoring unit, and a capacitance control unit. The power generation unit includes a resonant circuit and a rectification circuit, and generates electric power to be supplied to the memory unit. The resonant circuit includes an antenna coil and resonant capacitance unit having a variable capacitance value, and the rectification circuit rectifies a resonant output of the resonant circuit. The power monitoring unit includes a current adjustment element, a reference voltage generation source, and an operational amplifier. The operational amplifier controls the (Continued)

current adjustment element such that an output voltage of the rectification circuit is equal to a reference voltage from the reference voltage generation source. The capacitance control unit is configured to control the resonant capacitance unit on the basis of an output of the operational amplifier.

15 Claims, 10 Drawing Sheets

(51) Int. Cl.
  *G11B 5/008* (2006.01)
  *G11B 23/087* (2006.01)

(56) References Cited

FOREIGN PATENT DOCUMENTS

| | | |
|---|---|---|
| JP | 10-145987 A | 5/1998 |
| JP | 10-187916 A | 7/1998 |
| JP | 2004-229076 A | 8/2004 |
| JP | 2007-228621 A | 9/2007 |
| JP | 2009-211743 A | 9/2009 |
| JP | 2010-079451 A | 4/2010 |
| JP | 2011-034631 A | 2/2011 |

\* cited by examiner

NON-CONTACT COMMUNICATION MEDIUM, DRIVING METHOD THEREFOR, AND RECORDING MEDIUM CARTRIDGE

TECHNICAL FIELD

The present technology relates to, for example, a non-contact communication medium to be housed in a magnetic tape cartridge, a driving method therefor, and a recording medium cartridge including the non-contact communication medium.

BACKGROUND ART

For example, a magnetic tape cartridge of the LTO (Linear Tape Open) standard includes an RFID (Radio Frequency Identification) tag called a cartridge memory (see, for example, Patent Literature 1). The cartridge memory includes an antenna and an IC chip for communication and recording, and is configured to be capable of reading and writing production management information of the magnetic tape, the outline of the recorded content, and the like. The cartridge memory receives a signal magnetic field transmitted from a tape drive (reader/writer) to generate electric power, and thus operates without power supply.

In recent years, the memory size of the cartridge memory has become larger in proportion to the increase in the recording data size of the magnetic tape. As the memory size of the cartridge memory increases, the power consumed by the cartridge memory also increases. Meanwhile, since this type of cartridge memory is required to operate at a constant magnetic field strength, there is a limitation on the electric power that can be drawn from the antenna. Accordingly, there is a need for a technology for driving a cartridge memory with electric power that can be drawn from an antenna independent of the memory size and ensuring stable communication with a reader/writer.

For example, Patent Literature 2 discloses an RFID tag configured to monitor an output voltage of a rectification circuit that rectifies an antenna resonant output, and to be capable of obtaining an output voltage of a predetermined value or more by adjusting a resonant capacitance in the case where the output voltage does not reach the predetermined value within a predetermined time.

CITATION LIST

Patent Literature

Patent Literature 1: Japanese Patent Application Laid-open No. 2009-211743
Patent Literature 2: Japanese Patent Application Laid-open No. 2007-228621

DISCLOSURE OF INVENTION

Technical Problem

However, in the configuration of Patent Literature 2, even if the output voltage of the rectification circuit reaches a predetermined value, the current value that can be obtained decreases drastically as the deviation of the resonant capacitance value from the expected value increases, and thus, the target electric power cannot be stably secured in some cases.

In view of the circumstances as described above, it is an object of the present technology to provide a non-contact communication medium capable of stably securing target electric power, a driving method therefor, and a recording medium cartridge including the non-contact communication medium.

Solution to Problem

A non-contact communication medium according to an embodiment of the present technology includes: a memory unit; a power generation unit; a power monitoring unit; and a capacitance control unit.

The memory unit stores predetermined management information.

The power generation unit includes a resonant circuit and a rectification circuit, and generates electric power to be supplied to the memory unit, the resonant circuit including an antenna coil and resonant capacitance unit having a variable capacitance value, the rectification circuit rectifying a resonant output of the resonant circuit.

The power monitoring unit includes a current adjustment element, a reference voltage generation source, and an operational amplifier, the current adjustment element being connected to an input side or an output side of the rectification circuit and being capable of adjusting an output voltage of the rectification circuit, the reference voltage generation source generating a reference voltage, the operational amplifier controlling the current adjustment element such that the output voltage of the rectification circuit is equal to the reference voltage.

The capacitance control unit is configured to control the resonant capacitance unit on the basis of an output of the operational amplifier.

In the non-contact communication medium, since the resonant capacitance is controlled while monitoring the electric power of the power generation unit, it is possible to stably secure target electric power.

The current adjustment element may be connected in parallel to the resonant circuit on an input side of the rectification circuit.

The current adjustment element may be connected between an output terminal of the rectification circuit and a ground terminal.

The capacitance control unit may be configured to set the resonant capacitance unit to a capacitance value at which the output voltage of the rectification circuit is maximized.

The capacitance control unit may include a comparator that compares outputs of the operational amplifier before and after adjustment of the capacitance value.

The capacitance control unit may further include a storage capacitance capable of holding an output of the comparator as a reference value, and a switch provided between an output terminal of the comparator and the storage capacitance, and the comparator may be configured to be capable of switching between a first state and a second state, the switch being closed to charge the storage capacitance in the first state, the switch being opened to compare the output of the operational amplifier with the reference value in the second state.

The capacitance control unit may be configured to set, where a change amount of the output of the operational amplifier before and after adjustment of the capacitance value is zero, the resonant capacitance unit to a capacitance value at which a resonant output of the resonant circuit decreases by a predetermined amount or more.

A recording medium cartridge according to an embodiment of the present technology includes: an information recording medium; a cartridge case; and a non-contact communication medium.

The cartridge case houses the information recording medium.

The non-contact communication medium includes a memory unit, a power generation unit, a power monitoring unit, and a capacitance control unit, and is housed in the cartridge case.

The memory unit stores predetermined management information regarding the information recording medium.

The power generation unit includes a resonant circuit and a rectification circuit, and generates electric power to be supplied to the memory unit, the resonant circuit including an antenna coil and resonant capacitance unit having a variable capacitance value, the rectification circuit rectifying a resonant output of the resonant circuit.

The power monitoring unit includes a current adjustment element, a reference voltage generation source, and an operational amplifier, the current adjustment element being connected in parallel to an input side or an output side of the rectification circuit and being capable of adjusting an output voltage of the rectification circuit, the reference voltage generation source generating a reference voltage, the operational amplifier controlling the current adjustment element such that the output voltage of the rectification circuit is equal to the reference voltage.

The capacitance control unit is configured to control the resonant capacitance unit on the basis of an output of the operational amplifier.

The information recording medium may be a magnetic tape.

A method of driving a non-contact communication medium according to an embodiment of the present technology includes: obtaining an output voltage of a rectification circuit that rectifies a resonant output of a resonant circuit including an antenna coil and a resonant capacitance.

A resistance value of a current adjustment element that is connected to an input side or an output side of the resonant circuit and is capable of adjusting the output voltage of the rectification circuit is controlled such that the output voltage of the rectification circuit is equal to a predetermined reference voltage.

A capacitance value of the resonant capacitance is controlled such that the output voltage of the amplification circuit is maximized.

Information is read from or written to a memory unit.

Advantageous Effects of Invention

As described above, in accordance with the present technology, it is possible to stably secure target electric power.

Note that the effect described here is not necessarily limitative, and any of the effects described in the present disclosure may be provided.

MODE(S) FOR CARRYING OUT THE INVENTION

An embodiment according to the present technology will now be described below with reference to the drawings.

Figure 1:
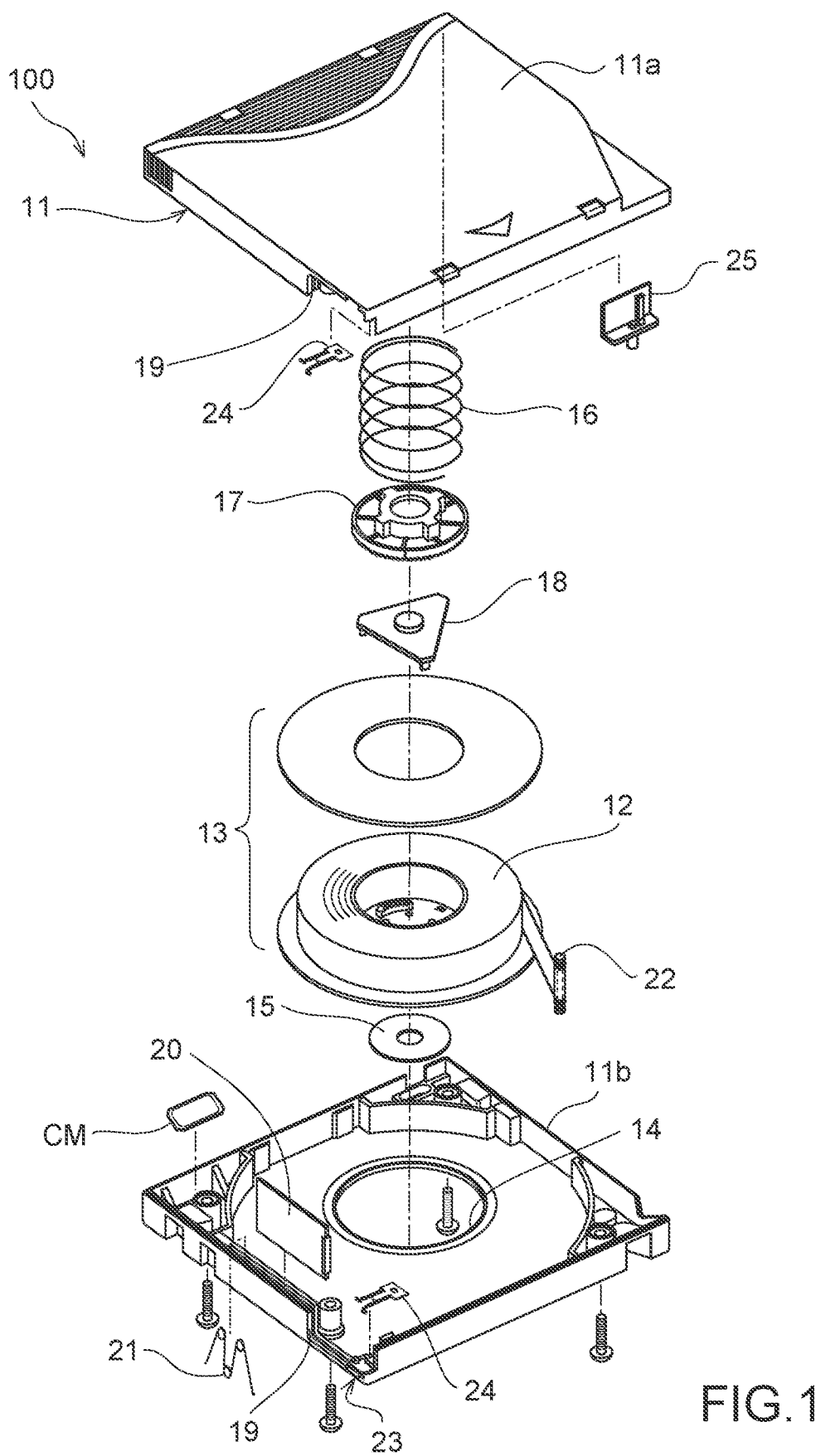
FIG. 1 is an exploded perspective view showing a magnetic tape cartridge according to an embodiment of the present technology.
Figure 2:
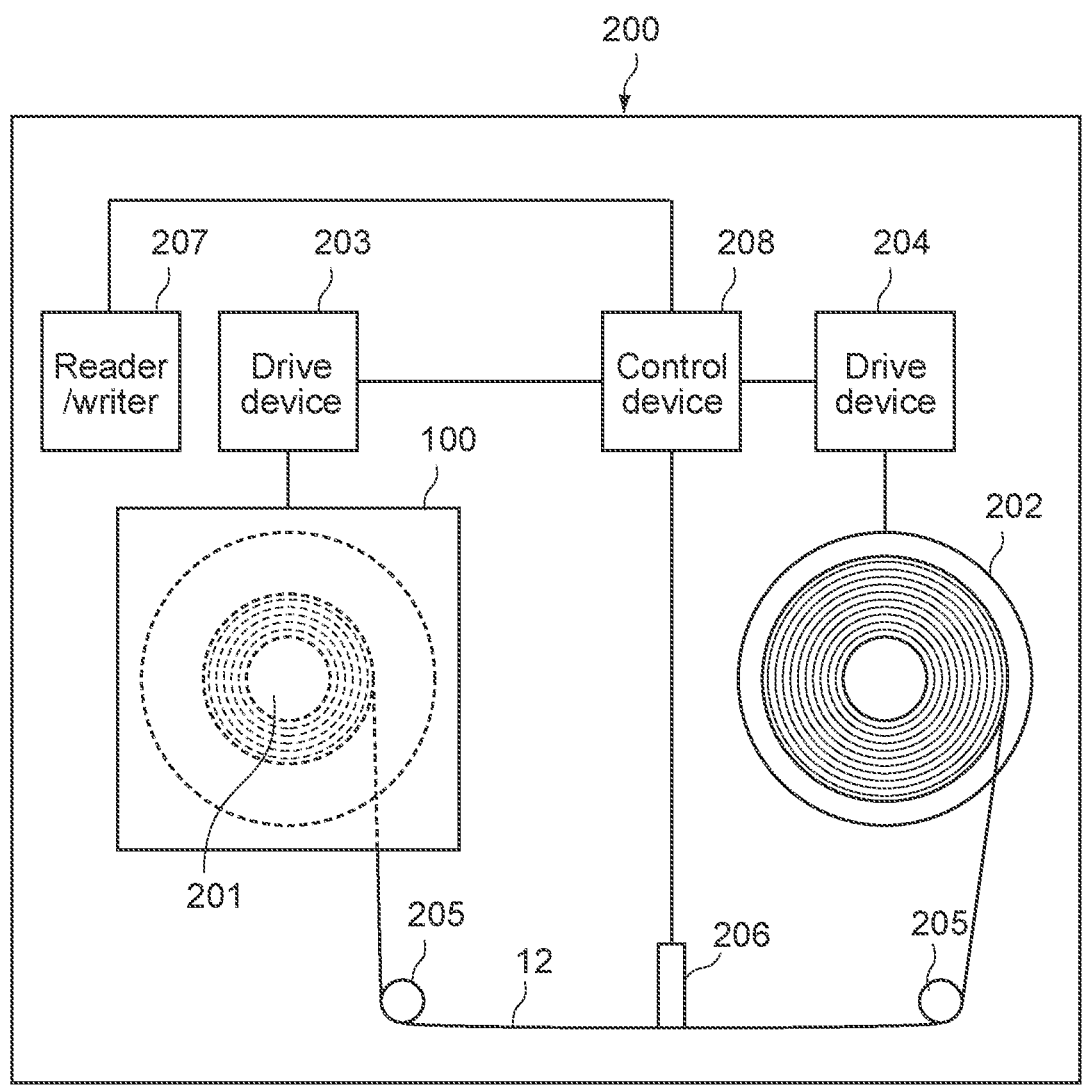
FIG. 2 is a schematic perspective view of a tape drive device.

FIG. 1 is an exploded perspective view showing a magnetic tape cartridge according to an embodiment of the present technology, and FIG. 2 is a schematic perspective view of a tape drive device. In this embodiment, a magnetic tape cartridge of the LTO standard shown in FIG. 1 (hereinafter, referred to as the tape cartridge 100) will be described as a recording medium cartridge. Hereinafter, the configuration of the tape cartridge 100 and a tape drive device 200 shown in FIG. 2 will be schematically described.

[Tape Cartridge]

As shown in FIG. 1, the tape cartridge 100 includes a cartridge case 11 formed by connecting an upper shell 11a and a lower shell 11b by a plurality of screw members. A single tape reel 13 on which a magnetic tape 12 as information recording medium is wound is rotatably accommodated inside the cartridge case 11.

A chucking gear (illustration omitted) that engages with a spindle 201 (see FIG. 2) of the tape drive device 200 is formed in an annular shape at the bottom center of the tape reel 13, and the chucking gear is exposed to the outside through an opening 14 formed in the center of the lower shell 11b. An annular metal plate 15 magnetically attracted to the spindle 201 is fixed to the inner periphery side of the chucking gear.

A reel spring 16, a reel lock member 17, and a spider 18 are disposed between the inner surface of the upper shell 11a and the tape reel 13. They constitute a reel locking mechanism that prevents the tape reel 13 from rotating when the tape cartridge 100 is not in use.

A tape outlet 19 for drawing out one end of the magnetic tape 12 to the outside is provided in one side wall portion of the cartridge case 11. A slide door 20 for opening and closing the tape outlet 19 is disposed inside the side wall portion. The slide door 20 is configured to slide in a direction that opens the tape outlet 19 against the biasing force of a torsion spring 21 by engagement of the tape drive device 200 with a tape loading mechanism (not shown).

A leader pin 22 is fixed to one end portion of the magnetic tape 12. The leader pin 22 is configured to be attachable/detachable to/from a pin holding portion 23 provided on the inner side of the tape outlet 19. The pin holding portion 23 includes an elastic holder 24 for elastically holding the upper end portion and the lower end portion of the leader pin 22 between the upper wall inner surface of the cartridge case 11 (the inner surface of the upper shell 11a) and the bottom wall inner surface (the inner surface of the lower shell 11b), respectively.

Then, in addition to a safety tab 25 for preventing accidental erasure of information recorded on the magnetic tape 12, a cartridge memory CM capable of reading and writing the content related to the information recorded on the magnetic tape 12 in a non-contact manner is provided inside the other side wall of the cartridge case 21. The cartridge memory CM includes a non-contact communication medium in which an antenna coil, an IC chip, and the like are mounted on a substrate.

[Tape Drive Device]

As shown in FIG. 2, the tape drive device 200 is configured to be capable of loading the tape cartridge 100. The tape drive device 200 is configured to be capable loading one tape cartridge 100, but may be configured to be capable of loading a plurality of tape cartridges 100 simultaneously.

The tape drive device 200 includes a spindle 201, a take-up reel 202, a spindle drive device 203, a reel drive device 204, a plurality of guide rollers 205, a head unit 206, a reader/writer 207, a control device 208, and the like.

The spindle 201 includes a head portion that engages with the chucking gear of the tape reel 13 through the opening 14 formed in the lower shell 11b of the tape cartridge 100. The spindle 201 raises the tape reel 13 by a predetermined distance against the biasing force of the reel spring 16, releasing the reel lock function by the reel lock member 17. Thus, the tape reel 13 is rotatably supported inside the cartridge case 11 by the spindle 201.

The spindle drive device 203 causes, in response to a command from the control device 208, the spindle 201 to rotate. The take-up reel 202 is configured to be capable of fixing the tip (leader pin 22) of the magnetic tape 12 drawn from the tape cartridge 100 via the tape loading mechanism (not shown). The plurality of guide rollers 205 guides the travelling of the magnetic tape 12 such that the tape path formed between the tape cartridge 100 and the take-up reel 202 is in a predetermined relative position relative to the head unit 206. The reel drive device 204 causes, in response to a command from the control device 208, the take-up reel 202 to rotate. When data signals are recorded/reproduced on/from the magnetic tape 12, the spindle 201 and the take-up reel 202 are caused to rotate by the spindle drive device 203 and the reel drive device 204 and thus, the magnetic tape 12 is caused to travel.

The head unit 206 is configured to be capable of recording data signals on the magnetic tape 12 or reproducing the data signals written to the magnetic tape 12 in response to a command from the control device 208.

The reader/writer 207 is configured to be capable of reading predetermined management information from the cartridge memory CM mounted on the tape cartridge 100 or recording predetermined management information on the cartridge memory CM in response to a command the from control device 208. As a communication system between the reader/writer 207 and the cartridge memory CM, for example, an ISO14443 system is adopted.

The control device 208 includes, for example, a computer including a CPU (Central Processing Unit), a storage unit, a communication unit, and the like, and integrally controls the respective units of the tape drive device 200.

[Cartridge Memory]

Next, detailed description of the cartridge memory CM will be described.

(Basic Configuration)

Figure 3:
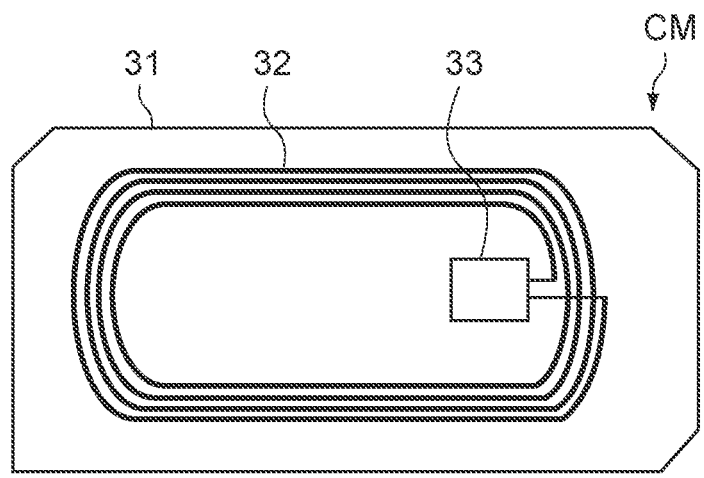
FIG. 3 is a schematic plan view showing a non-contact communication medium mounted on the above-mentioned magnetic tape cartridge.

FIG. 3 is a schematic plan view showing the cartridge memory CM. The cartridge memory CM includes an RFID tag including a support substrate 31, an antenna coil 32, and an IC chip 33.

The support substrate 31 includes a relatively rigid wiring substrate such as a glass-epoxy substrate. The antenna coil 32 is a planar loop coil formed on the support substrate 31, and is made of a copper foil, an aluminum foil, or the like, which has a predetermined thickness. The IC chip 33 is mounted on the support substrate 31 and electrically connected to the antenna coil 32. The IC chip 33 includes, therein, a voltage generation unit, a memory unit, a control unit, and the like, the voltage generation unit generating an activation voltage on the basis of a signal magnetic field from the reader/writer 207 received via the antenna coil 32, the memory unit storing predetermined management information regarding the tape cartridge 100, the control unit reading information from the memory unit.

The cartridge memory CM receives a signal magnetic field transmitted from the reader/writer 207 by the antenna coil 32 to generate power, and thus operates without power supply. The power supply/communication frequency from the reader/writer 207 is 13.56 MHz, which is the same as that of NFC (Near Field Communication). A non-volatile memory (NVM) is used for the memory incorporated in the IC chip 33.

Here, the memory size of the cartridge memory of the LTO standard is increasing in proportion to the increase in the size of data recorded on the magnetic tape. As an example, the memory size has been 4 kB in LTO-1 to LTO-3, but has increased to 8 kB in LTO-4 and LTO-5 and to 16 kB LTO-6 and LTO-7. It is expected that as the magnetic recording data size of LTOs further increases, the memory size of the cartridge memory increases.

However, as the memory size of the cartridge memory increases, the power consumed by the IC tends to increase. Further, also the electric power is assumed to increase associated with the increase in the memory size, e.g., the idle current of the power supply block increases due to the necessity to increase the stability of the power supply voltage to be supplied to the memory, or the digital power increases associated with processing complexity. In the standard, since it is specified as a requirement to operate at a constant magnetic field strength, innovation of ICs (reduced power consumption) and innovation of antennas (increased power extraction from a reader/writer) that can cope with the increase in the electric power caused by the increase in the memory size may be further required in the future.

Meanwhile, in this type of cartridge memory, the resonant frequencies are adjusted by the capacitances built in the IC from the viewpoints of cost and reliability. However, the capacitive element of the IC has a variation in the capacitance value for each product due to variations in production. When the resonant frequency is shifted by such individual variation, the electric power that can be drawn from the antenna is reduced.

Figure 4:
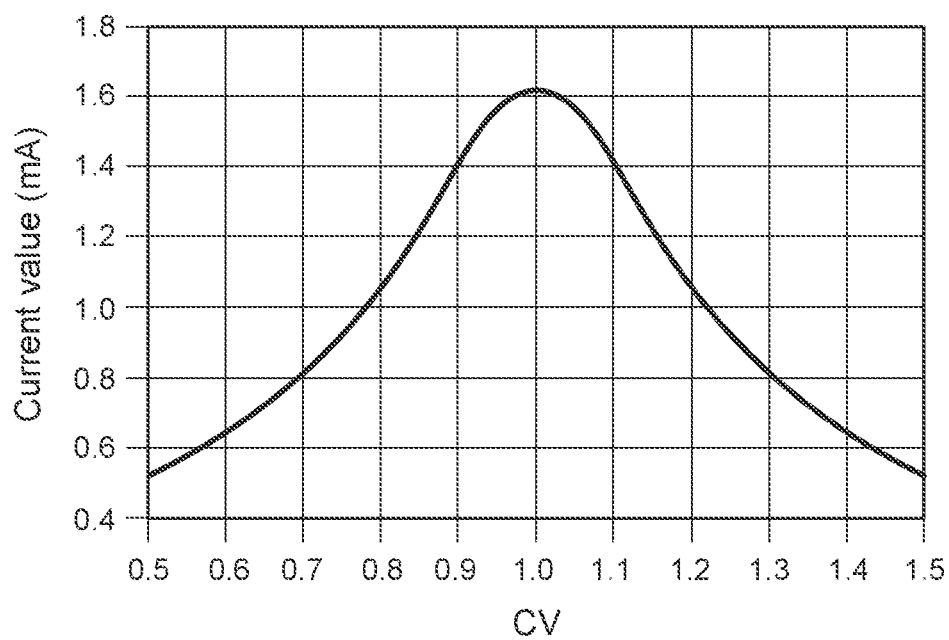
FIG. 4 is an experimental result showing an example of the relationship between a resonant capacitance value and an obtained current value in the above-mentioned non-contact communication medium.

FIG. 4 shows an experimental result showing an example of the relationship between the resonant capacitance value and the obtained current value. The horizontal axis indicates a rate of change of the resonant capacitance value, and the expected value (the capacitance value when the obtained current value is the highest) in the resonant capacitance is set to 1.0. Therefore, the resonant capacitance value of 1.1 represents a state in which the resonant capacitance is 10% larger than the expected value, and the resonant capacitance value of 0.9 represents a state in which the resonant capacitance is 10% smaller than the expected value. The vertical axis indicates the value of the current flowing to a constant load, which corresponds to electric power. As shown in the figure, when the resonant capacitance value deviates from the expected value, the current (electric power) that can be obtained decreases sharply. For example, when the resonant capacitance value varies by approximately 15%, the obtained current drops to ¾ of that in the case of the expected value.

There are several conceivable ways to adjust the resonant capacitance inside the IC. For example, there is a method of using a partial area of the non-volatile memory as an area for storing parameters for adjusting the resonant capacitance. In this method, the capacitance value inside the IC is measured in advance, and the capacitance value (expected value), which is a correct value, or the set value relating to the difference between the measured value and the correct value is stored in the memory. Then, the set value is read at the time of activation, and the resonant capacitance value is adjusted using the read set value as a correction parameter. However, since this method needs to read the set value from the memory with the electric power obtained at the time of activation, there is a possibility that the set value cannot be read from the memory if the electric power at the time of activation is insufficient.

In this regard, in the cartridge memory CM in this embodiment, the electric power that can be obtained from the antenna is maximized by the following configuration instead of the method of reading the correction parameter of the resonant capacitance from the memory.

(Configuration of Cartridge Memory According to This Embodiment)

Figure 5:
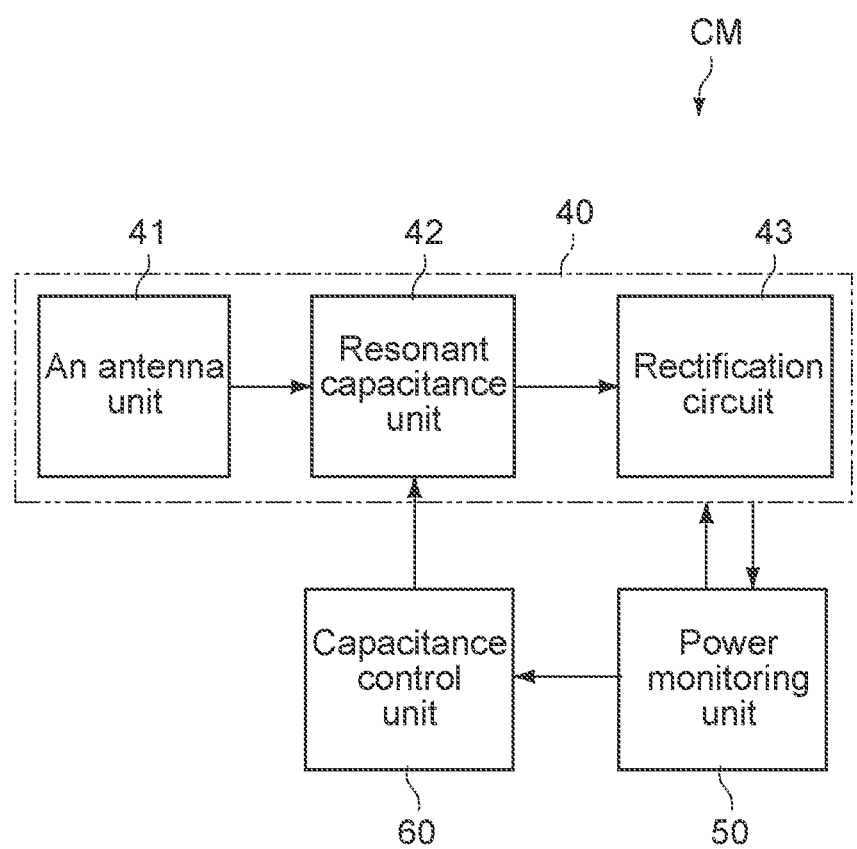
FIG. 5 is a functional block diagram schematically showing the above-mentioned non-contact communication medium.
Figure 6:
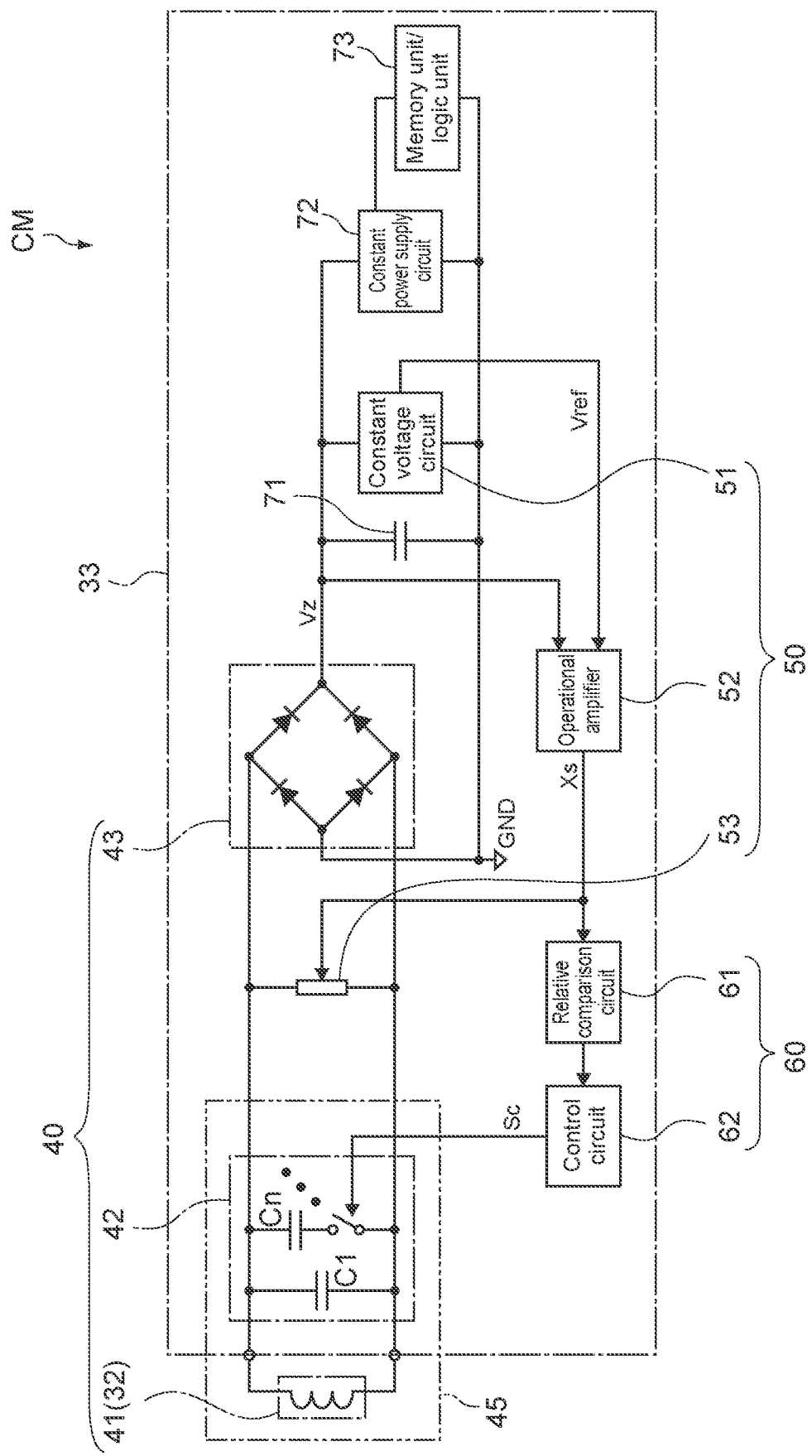
FIG. 6 is a circuit diagram showing a configuration example of the above-mentioned non-contact communication medium.

FIG. 5 is a block diagram schematically showing a configuration of the power supply circuit in the cartridge memory CM in this embodiment, and FIG. 6 is a circuit diagram showing a configuration example thereof.

As shown in FIG. 5 and FIG. 6, the cartridge memory CM includes a power generation unit 40, a power monitoring unit 50, and a capacitance control unit 60.

(Power Generation Unit)

The power generation unit 40 includes an antenna unit 41, a resonant capacitance unit 42, and a rectification circuit 43.

The antenna unit 41 corresponds to the antenna coil 32 shown in FIG. 3. The antenna unit 41 receives a signal magnetic field transmitted from the reader/writer 207. The resonant capacitance unit 42 is a capacitive element that constitutes a resonant circuit 45 together with the antenna unit 41. The resonant capacitance unit 42 typically includes a plurality of capacitive elements and a plurality of switch elements for switching connections of the plurality of capacitive elements in order to make the capacitance value variable.

The capacitance value of the resonant capacitance unit 42 is controlled by the capacitance control unit 60, as described below. As shown in FIG. 6, the resonant capacitance unit 42 includes a reference capacitance C1 connected to the antenna unit 41 and a plurality of adjustment capacitances Cn connectable to the antenna unit 41. The plurality of adjustment capacitances Cn is connected in parallel to the reference capacitance C1. As a result, the capacitance value of the resonant capacitance unit 42 is arbitrarily set by increasing or decreasing the number of adjustment capacitances Cn connected to the antenna unit 41 one by one (one bit at a time) in accordance with the output of the power monitoring unit 50, The rectification circuit 43 includes a rectifier for rectifying a resonant output of the resonant circuit 45. The rectification circuit 43 typically includes a full wave rectifier. However, the present technology is not limited thereto, and the rectification circuit 43 may include a half wave rectifier.

An output of the power generation unit 40 (output voltage Vz of the rectification circuit 43) is supplied to a constant voltage circuit 51 and a constant power supply circuit 72 via a smoothing capacitor 71. The constant voltage circuit 51 constitutes a part of the power monitoring unit 50, and the constant power supply circuit 72 generates a drive voltage for driving a memory unit/logic unit 73.

The memory unit/logic unit 73 includes a memory unit, a control unit, and the like, the memory unit storing predetermined management information relating to the tape cartridge 100 or the magnetic tape 12, the control unit reading management information from the memory unit in response to a request from the reader/writer 207 or generating a control signal for writing management information to the memory unit. Examples of the predetermined management information include information regarding the tape cartridge 100 on which the cartridge memory CM is mounted, such as identification information (ID) of the tape cartridge 100 or the cartridge memory CM and management information of the data recorded on the magnetic tape 12. The memory unit includes a non-volatile memory, and the memory size is not particularly limited, and is, for example, 4 kilobytes, 8 kilobytes, 16 kilobytes, or 32 kilobytes or more.

The above-mentioned control unit is configured by a computer including a CPU, an internal memory, and the like. The above-mentioned control unit executes various programs stored in the internal memory to integrally control the respective units of the cartridge memory CM. The internal memory includes a non-volatile memory and a volatile memory used as a work area. The above-mentioned control unit performs control of reading/writing information from/to the above-mentioned memory unit after the capacitance value of the resonant capacitance unit 42 is optimized by the capacitance control unit 60.

Note that the cartridge memory CM includes, in addition to the above, a clock signal generation circuit, a detection circuit, a modulator circuit, a demodulator circuit, and the like, but the illustration thereof is omitted.

(Power Monitoring Unit)

The power monitoring unit 50 includes the constant voltage circuit 51, an operational amplifier 52, and a current adjustment element 53. In this embodiment, the power monitoring unit 50 is configured to be capable of controlling the current adjustment element 53 incorporated into the resonant circuit 45 such that the output voltage Vz of the rectification circuit 43 has a predetermined value.

The constant voltage circuit 51 is configured as a reference voltage generation source for generating a predetermined reference voltage Vref. The output voltage (Vref) of the constant voltage circuit 51 is input to one input terminal of the operational amplifier 52. The reference voltage Vref is used as a reference value for controlling the output voltage Vz of the rectification circuit 43 to have a predetermined value when optimizing the capacitance value of the resonant capacitance unit 42 at the time of activation of the cartridge memory CM, as described below. The magnitude of the reference voltage Vref is not particularly limited, and is set to a predetermined voltage value, for example, 1.25 V, which is capable of obtaining electric power required for driving the power monitoring unit 50 and the capacitance control unit 60.

The operational amplifier 52 includes a first input terminal (inverting input terminal) to which the output voltage Vz of the rectification circuit 43 is input, and a second input terminal (non-inverting input terminal) to which the reference voltage Vref is input. The operational amplifier 52 calculates the difference between the output voltage Vz of the rectification circuit 43 and the reference voltage Vref, and inputs a difference signal Xs obtained by multiplying the difference by a predetermined gain to the current adjustment element 53 and the capacitance control unit 60.

The current adjustment element 53 is configured to be capable of adjusting the current value to be input from the resonant circuit 45 to the rectification circuit 43. In this embodiment, the current adjustment element 53 is connected in parallel to the resonant circuit 45 on the input side of the rectification circuit 43 and shunts the current to be input from the resonant circuit 45 to the rectification circuit 43 to adjust the output voltage of the rectification circuit. The current adjustment element 53 is configured by an element whose resistance value is variable, e.g., a variable resistor or a transistor element. In this embodiment, the current adjustment element 53 is configured such that the resistance value decreases as the output voltage Vz of the rectification circuit 43 increases with respect to the reference voltage Vref, and the resistance value increases as the output voltage Vz decreases.

The power monitoring unit 50 has a negative feedback loop such that the operational amplifier 52 causes the output voltage Vz of the rectification circuit 43 to be equal to the reference voltage Vref loop. This loop causes the extra power generated in the resonant circuit 45 for keeping the output voltage Vz of the rectification circuit 43 constant to be discarded through the current adjustment element 53. The current discarded through the current adjustment element 53 (current flowing through the current adjustment element 53) is proportional to the obtained current in the resonant circuit 45, and the difference signal Xs for controlling the current adjustment element 53 corresponds to an analogue voltage corresponding to the power in the power generation unit 40. Therefore, the power monitoring unit 50 is capable of monitoring the power of the power generation unit 40 through the difference signal Xs.

(Capacitance Control Unit)

The capacitance control unit 60 is configured to control the resonant capacitance unit 42 on the basis of the difference signal Xs. In this embodiment, the capacitance control unit 60 is configured to set the resonant capacitance unit 42 to the capacitance value at which the output voltage Vz of the rectification circuit 43 is maximized.

The capacitance control unit 60 includes a relative comparison circuit 61 and a control circuit 62.

The relative comparison circuit 61 compares the outputs of the operational amplifier 52 before and after adjustment of the capacitance value of the resonant capacitance unit 42. That is, the relative comparison circuit 61 compares the value of the difference signal Xs when the capacitance value was adjusted last time (the current output value) and the value of the difference signal Xs when the capacitance value was adjusted the time before last (the previous output value), and inputs an output signal to the control circuit 62 in accordance with the comparison result.

Figure 7:
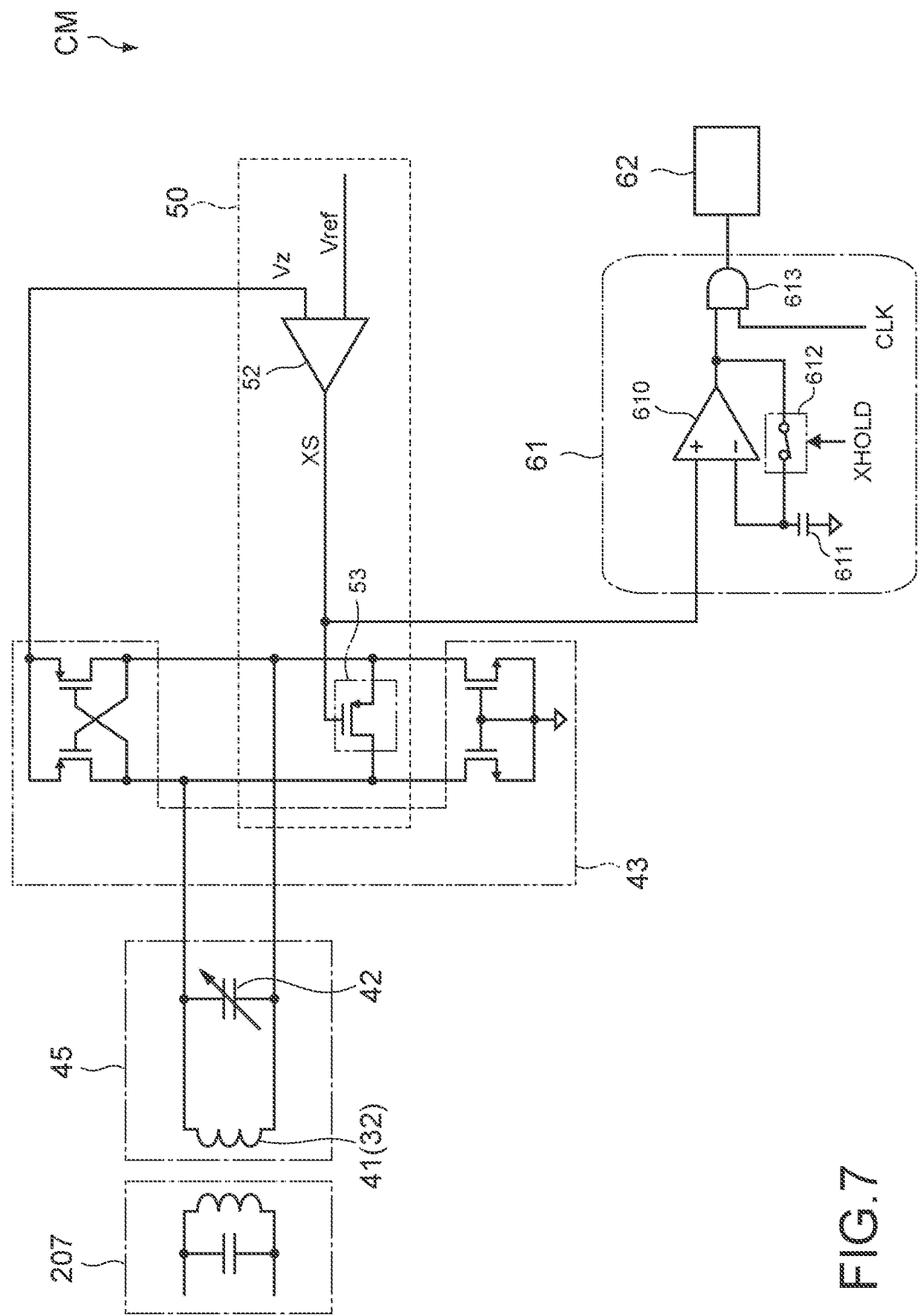
FIG. 7 is a circuit diagram showing a configuration example of a capacitance control unit in the above-mentioned non-contact communication medium.

FIG. 7 is a circuit diagram showing a configuration example of the relative comparison circuit 61.

The relative comparison circuit 61 includes a comparator 610, a storage capacitance 611, and a switch 612. The comparator 610 includes a first input terminal to which the output (difference signal Xs) of the operational amplifier 52 is input, and a second input terminal to which the charge voltage of the storage capacitance 611 is input. The storage capacitance 611 is configured by a capacitive element capable of holding the output of the comparator 610. The switch 612 is provided between the output terminal of the comparator 610 and the storage capacitance 611, and is typically configured by a switching element such as a transistor.

The relative comparison circuit 61 is configured to be capable of switching between a first state and a second state, the switch 612 being closed to charge the storage capacitance 611 in the first state, the switch 612 being opened to compare the output (difference signal Xs) of the operational amplifier with the reference value (charge voltage of the storage capacitance 611) in the second state. In other words, the comparator 610 functions as a voltage follower in the first state and as a comparator in the second state. The switch 612 is opened and closed at a predetermined period to alternately execute the first state and the second state.

The output of the comparator 610 is input to one input terminal of an AND gate 613. A clock signal of the same period as the opening and closing period of the switch 612 is input to the other input terminal of the AND gate 613. The AND gate 613 outputs only the output of the comparator 610 in the second state to the control circuit 62.

The control circuit 62 controls the resonant capacitance unit 42 on the basis of the output of the relative comparison circuit 61. In this embodiment, the control circuit 62 generates, on the basis of the output of the relative comparison circuit 61, i.e. the values of the difference signal Xs before and after the adjustment of the capacitance value of the resonant capacitance unit 42, a control command Sc for increasing or decreasing the capacitance value in a stepwise manner, and outputs the control command Sc to the resonant capacitance unit 42. The control circuit 62 continues setting control over the resonant capacitance unit 42 until the output voltage Vz of the rectification circuit 43 is maximized.

Figure 8:
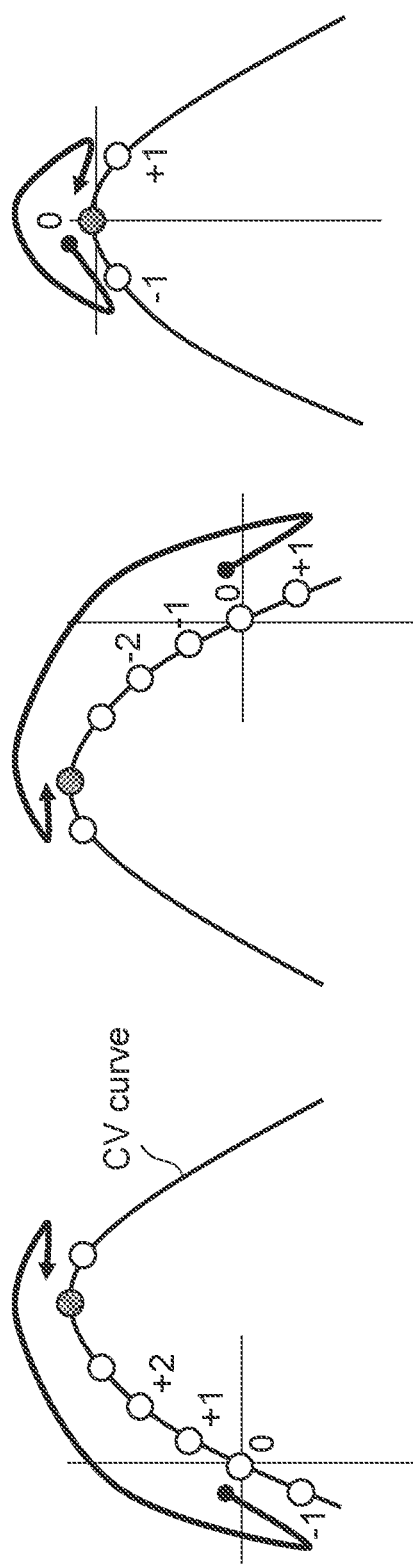
FIG. 8 is a conceptual diagram showing a setting procedure of a capacitance value in the above-mentioned non-contact communication medium.

FIG. 8 is a conceptual diagram showing a setting procedure of a capacitance value executed in the control circuit 62. In the figure, Part (a) shows the optimization procedure from the state where the capacitance value is shifted to a lower level, Part (b) shows the optimization procedure from the state where the capacitance value is shifted to a higher level, and Part (c) shows the optimization procedure when the capacitance value is just.

The curves in the respective states drawn in FIG. 8 each correspond to the CV-curve (see FIG. 4) showing the relationship between the capacitance value (horizontal axis) and the current value (vertical axis). In the figure, "0" represents a control starting point, and corresponds to the initial value of the resonant capacitance unit 42. The initial value of the capacitance is not particularly limited, but is typically a combined capacitance of the reference capacitance C1 and an arbitrary number of adjustment capacitances Cn. Thus, by increasing or decreasing the number of adjustment capacitances Cn, the resonant capacitance can be changed in both the positive direction and the negative direction.

At the beginning of the control, it is unclear whether the capacitance value is shifted higher or lower than the optimal value. For this reason, first, the outputs of the difference signal Xs when the capacitance value is set to "+1" and the capacitance value is set to "−1" are compared with each other to determine whether the capacitance value has been shifted to the + side or the − side. After the polar of the shift of the capacitance value is known, the control circuit 62 detects a code (capacitance value) in which the value of the difference signal Xs changes from increasing to decreasing, and determines the code in front as the optimal value, as indicated by the arrows in FIG. 8.

The control circuit 62 may be configured to set, where the change amount of the output (difference signal Xs) of the operational amplifier 52 before and after the adjustment of the capacitance value of the resonant capacitance unit 42 is zero, the resonant capacitance unit 42 to a capacitance value at which the resonant output of the resonant circuit 45 decreases by a predetermined amount or more.

For example, when a strong magnetic field acts on the resonant circuit 45, the difference signal Xs is saturated to the voltage level of the output voltage Vz of the rectification circuit 43, and the magnitude of the difference signal Xs does not change even if the capacitance value of the resonant capacitance unit 42 is changed. As a result, also the output of the relative comparison circuit 62 is not changed. In this case, the control circuit 62 greatly changes the capacitance value of the resonant capacitance unit 42 to a value that cause the resonant circuit 45 to deviate from the resonant point. This may in some cases cause the electric power to drop to the degree that the operation system of the cartridge memory CM is shut down, but heat generation leading to destruction can be suppressed in advance.

The "capacitance value at which the resonant output of the resonant circuit 45 decreases by a predetermined amount or more" is not particularly limited, and can be set to an appropriate value capable of preventing damage due to heat generation of the resonant circuit 45 from a large current. In this embodiment, the capacitance value is set to a capacitance value (hereinafter, referred to also as the overpower capacitance) 50% higher than the initial capacitance.

The control circuit 62 is configured by a computer including a CPU and an internal memory. The control circuit 62 controls the resonant capacitance unit 42 in the procedure described above by executing various programs stored in the internal memory.

(Operation of Cartridge Memory)

Next, the control circuit 62 will be described in detail together with the operation of the cartridge memory CM.

Figure 9:
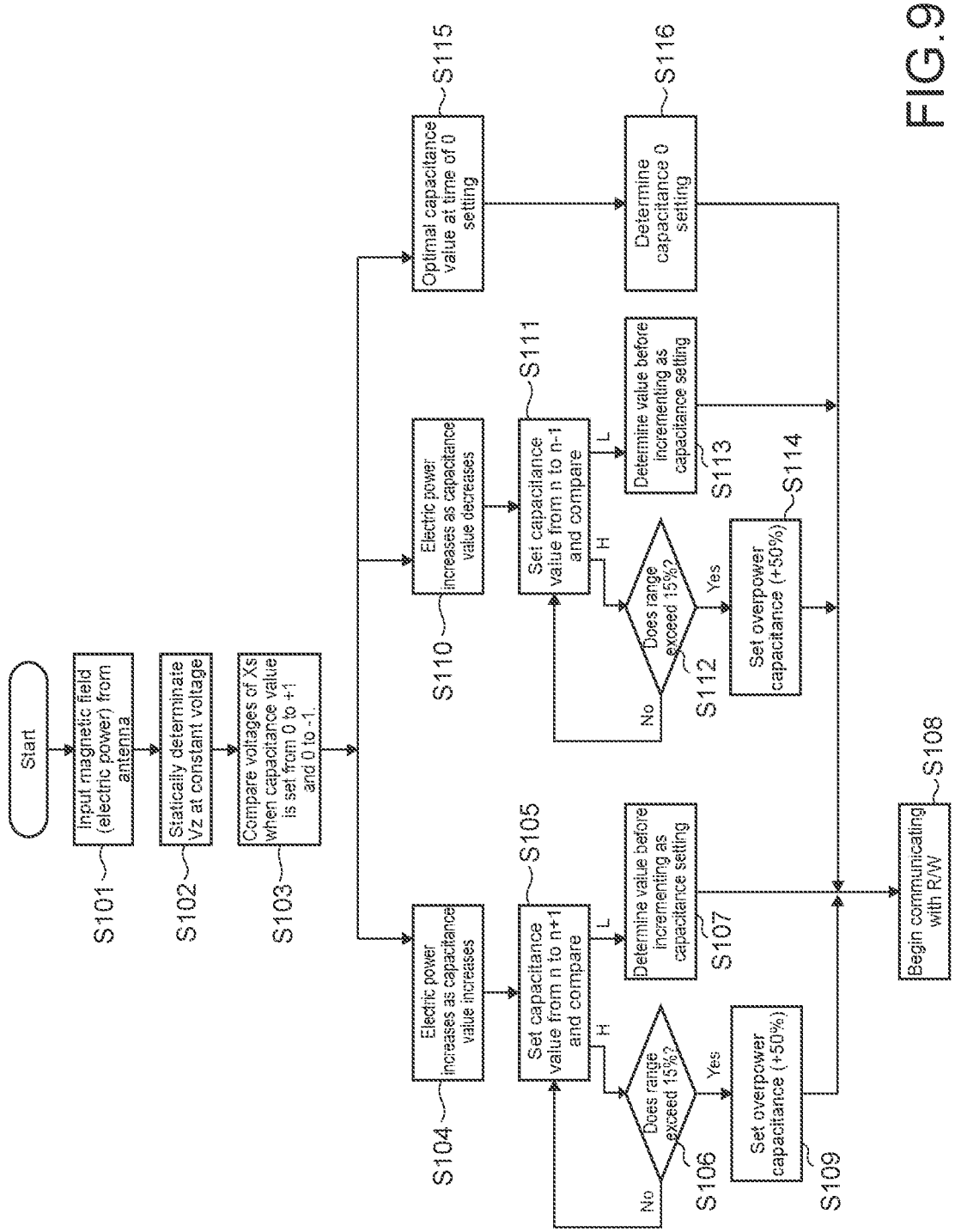
FIG. 9 is a flowchart describing an example of the operation of the above-mentioned non-contact communication medium.
Figure 10:
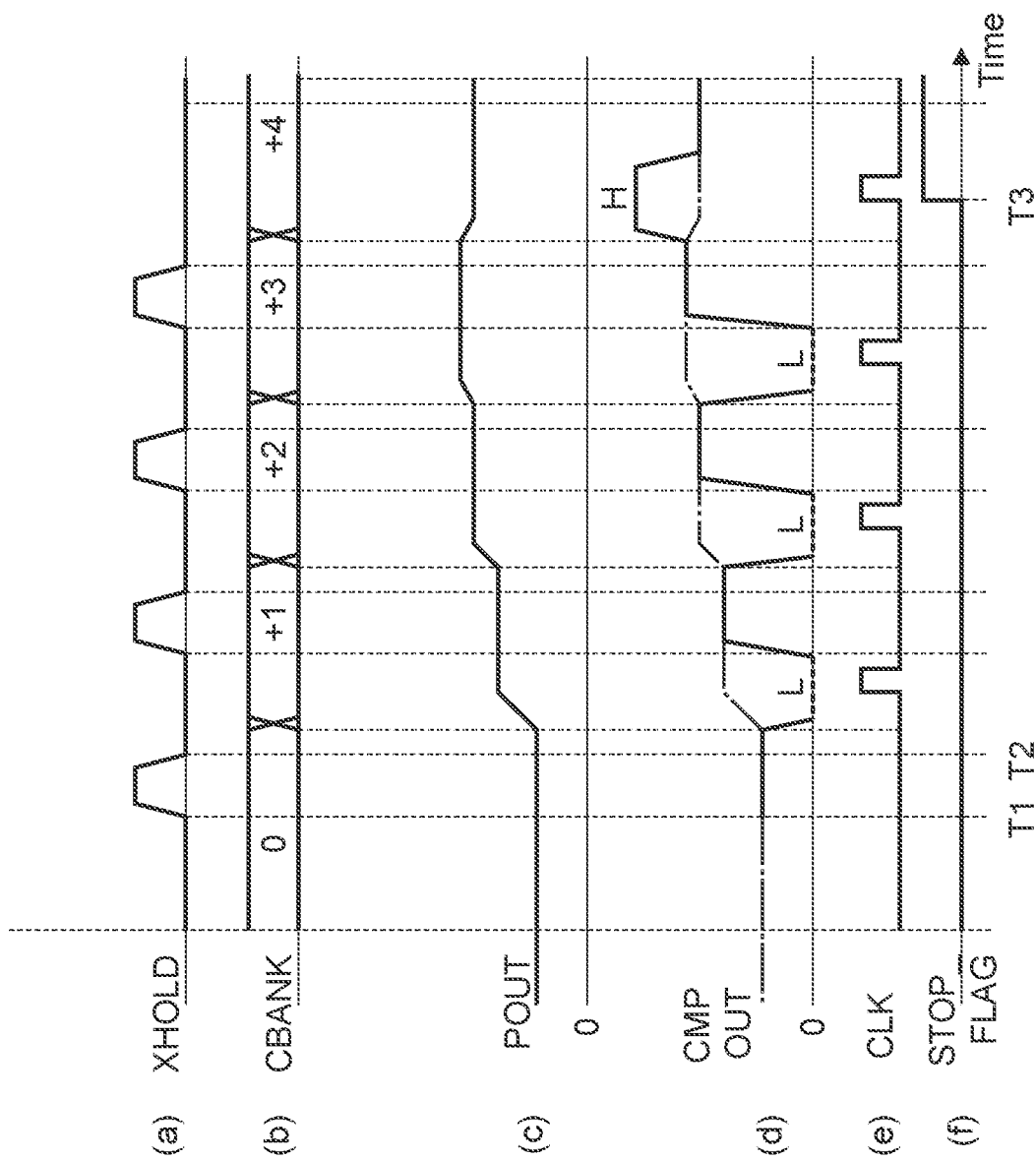
FIG. 10 is a timing chart showing an example of the operation of the above-mentioned capacitance control unit.

FIG. 9 is a flow chart showing the operation of the cartridge memory CM and the processing procedure of the control circuit 62. FIG. 10 is a timing chart showing an example of the operation of the capacitance control unit 60. In FIG. 10, Steps 103 to 107 and Steps 109 to 116 are each processing executed in the control circuit 62.

When the tape cartridge 100 is loaded into the tape drive device 200, a signal magnetic field transmitted from the reader/writer 207 via the antenna unit 41 is input to the cartridge memory CM (Step 101). When a signal magnetic field is input, the cartridge memory CM generates electric power in the power generation unit 40, and statically determinates the output voltage Vz of the rectification circuit 43 at a constant voltage (the reference voltage Vref) in the power monitoring unit 50 (Step 102).

The power monitoring unit 50 calculates the difference between the output voltage (Vref) of the constant voltage circuit 51 and the output voltage Vz of the rectification circuit 43 by the operational amplifier 52, and variably controls, on the basis of the difference signal Xs, the resistance value of the current adjustment element 53 so that the output voltage Vz coincides with the reference voltage Vref. The resistance value control in this the current adjustment element 53 is continuously executed during the optimization control of the capacitance value of the resonant capacitance unit 42 in the capacitance control unit 60 described later and even after the completion of the capacitance value optimization control.

Next, the capacitance value optimization control in the capacitance control unit 60 will be described.

In the capacitance value optimization control, first, processing of determining whether the initial value (control starting point) of the capacitance value is higher or lower than the optimal value is executed. Specifically, the outputs of the difference signal Xs when the capacitance value is set to "+1" and the capacitance value is set to "−1" are compared with each other to determine whether the capacitance value has been shifted to the + side or the − side (Step 103). Since the difference signal Xs is a value corresponding to the electric power generated in the power generation unit 40, it is possible to determine the increasing direction or decreasing direction of the electric power by comparing the magnitude of the difference signal Xs for each capacitance value.

In this example, it is determined that the capacitance value has been shifted to a lower level (S104) if the difference signal Xs increases when the capacitance value is set to "+1", and it is determined that the capacitance value has been shifted to a higher level (S110) if the difference signal Xs increases when the capacitance value is set to "−1". Further, it is determined that the initial value of the capacitance value is the optimal value (Step 115) if the difference signal Xs decreases when the capacitance value is set to either "+1" or "−1".

In the case where the capacitance value has been shifted to a higher level, the control circuit 62 executes control to change the capacitance value to the positive side in a stepwise manner. Hereinafter, referring also to FIG. 10, the operation of the capacitance control unit 60 will be described.

FIG. 10 is a timing chart for describing the operation of the capacitance control unit 60, and Part (a), Part (b), Part (c), Part (d), Part (e), and Part (f) respectively indicate the states of the switch 612, the capacitance value, the difference signal Xs, the output of the comparator 610, the clock signal, and the stop flag.

First, at a time T1, the switch 612 in the relative comparison circuit 61 is turned on, and the comparator 610 is set to the first state (the voltage follower state). As a result, the difference signal Xs when the capacitance value is the initial value "n" (CBANK_0) is charged to the storage capacitance 611 as the reference value.

Next, at a time T2, the switch 612 is switched off and the comparator 610 is set to the second state (comparator state). After that, the control circuit 62 sets the capacitance value "n" to a capacitance value "n+1" (CBANK_+1) obtained by changing the capacitance value by one step in the positive direction (Step 107). Thus, in the comparator 610, the difference signal Xs (n) when the capacitance value is "n" and the difference signal Xs (n+1) when the capacitance value is "n+1" are compared with each other (Step 105). As a result, in the case where the difference signal Xs (n+1) is higher, the capacitance value "n+1" is set to a capacitance value "n+2" (CBANK_+2) obtained by increasing the capacitance value by further one step in the positive direction (Steps 106 and 105).

In this embodiment, the capacitance control unit 60 is configured to have the variable range of the capacitance value of ±15% and variably changes the capacitance value in increments of 1%. However, the present technology is not limited thereto. Depending on the specification, the variable range can be set to an arbitrary variable range and the capacitance value can be set in arbitrary increments.

After that, in a similar manner, processing of comparing the magnitude of the difference signal Xs between the capacitance value "n+2" (CBANK_+2) after resetting and the previous capacitance value "n+1" (CBANK_+1), and incrementing, in the case where the difference signal in the capacitance value after the resetting is higher than the other, the capacitance value by further one step is repeatedly executed. Every time the switch 612 is opened and closed, the voltage corresponding to the difference signal Xs at that time is charged to the storage capacitance 611 as a reference value. Then, the incrementing processing is stopped when the difference signal in the capacitance value after the resetting becomes lower than the difference signal in the previous capacitance value, and the capacitance value is returned to the previous (before-incrementing) value and used as the optimal capacitance value. In the example shown in FIG. 10, the stop flag rises at a time T3 and the previous capacitance value (CBANK_+3) is determined as the optimal capacitance value (Step 107). The stop flag may be output from the relative comparison circuit 61, or may be generated as part of internal processing of the control circuit 62. Alternatively, the stop flag may be omitted.

When the resonant capacitance unit 42 is set to the optimal capacitance value, the amount of power generation in the power generation unit 40 is maximized. In this condition, the cartridge memory CM begins communicating with the reader/writer 207 (Step 108), and processing of reading/writing information from/to the memory unit/logic unit 73 is executed in response to a request from the reader/writer 207.

Note that if a strong magnetic field is input to the cartridge memory CM for some reason, the processing of incrementing the capacitance value exceeds the variable range of 15% in some cases. In this case, the capacitance value of the resonant capacitance unit 42 is set to the overpower capacitance (capacitance value 50% higher than the initial capacity (Step 109). If communication with the reader/writer 207 is started in this condition, there is a possibility that the electric power is insufficient when the memory unit/logic unit 73 is driven, and the operation of the cartridge memory CM is stopped. Meanwhile, damages caused by heat generation of the power generation unit 40, the power monitoring unit 50, and the like due to an increase in electric power can be avoided.

Meanwhile, in the case where the initial capacitance value has been shifted to a lower level, the control circuit 62 executes control to change the capacitance value in the negative direction in a stepwise manner (Steps 110 to 114, and 107). This control differs from the control example described above in that the capacitance value is sequentially incremented in the negative direction. Since the other processing is similar to that described above, description thereof is omitted here. In the case where the initial capacitance value is determined to be optimal, the initial capacitance value is determined as the optimal capacitance value (Steps 115, 116, and 107).

As described above, in accordance with this embodiment, since the resonant capacitance of the resonant circuit 45 can be automatically adjusted, it is possible to maximize the electric power of the power generation unit 40 without activating the memory unit/logic unit 73 that consumes a relatively large amount of electric power. As a result, it is possible to suppress a decrease in electric power due to the activation of the memory unit to a minimum, as compared with the method of reading the optimal parameter of the resonant capacitance from the memory unit and setting a capacitance value. Therefore, it is possible to execute a stable communication operation with the reader/writer 207.

In addition, it is possible to sufficiently cope with an increase in the memory capacity of the cartridge memory in the future due to an increase in the number of data tracs of the magnetic tape 12, and stably obtain the electric power required for the operation of the cartridge memory CM from the limited signal magnetic field strength regardless of the memory size.

Further, in accordance with this embodiment, since the resonant output of the power generation unit 40 is feedback-controlled such that the output voltage Vz of the rectification circuit 43 coincides with the reference voltage Vref, it is possible to stably control the resonant capacitance unit 42 to a capacitance value at which the electric power is maximized. Therefore, it is possible to minimize the reduction in the current value accompanying the activation of the memory unit as compared with the existing capacitive control system using only the voltage as a reference.

Other Embodiments

Figure 11:
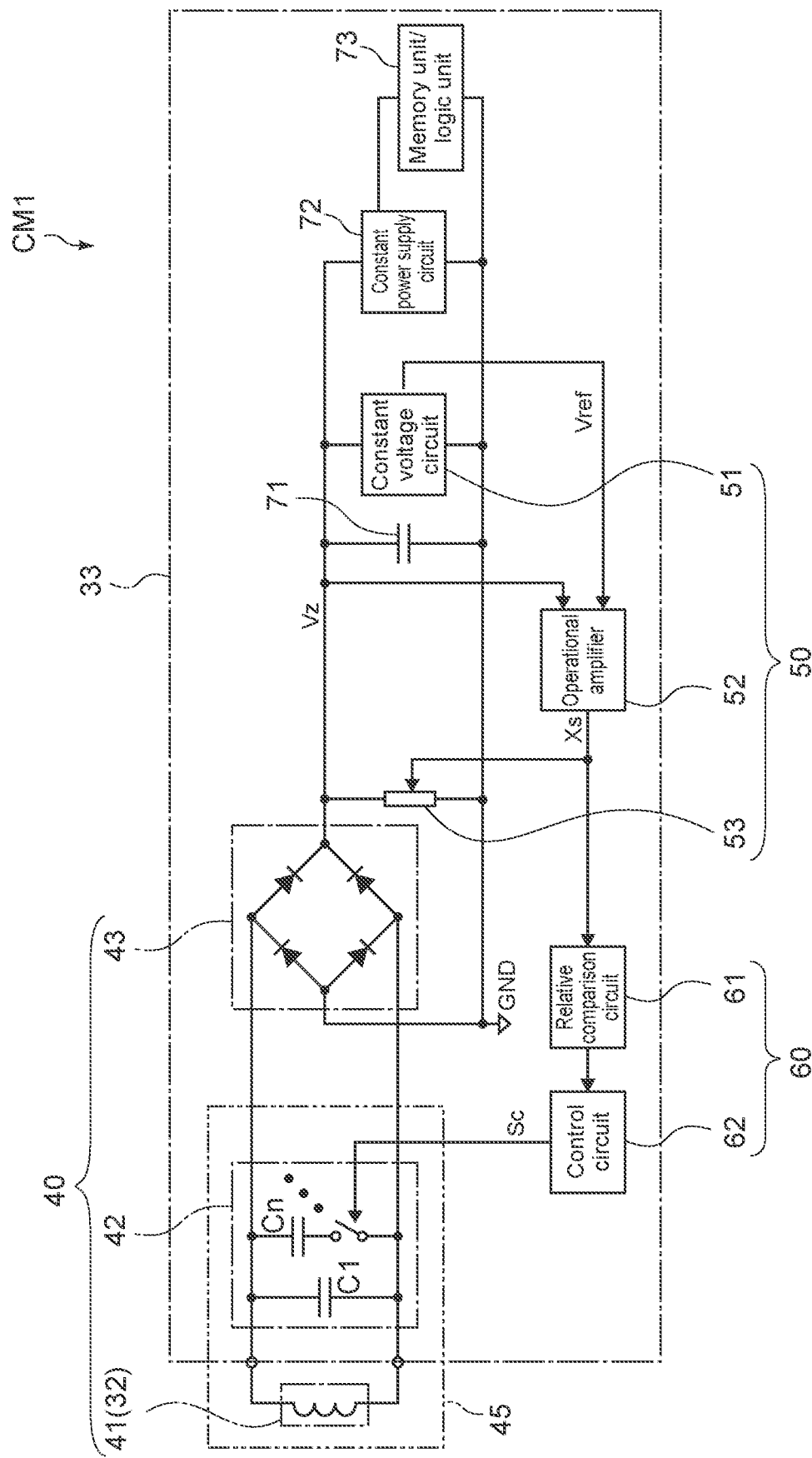
FIG. 11 is a circuit diagram showing another configuration example of the above-mentioned non-contact communication medium.

FIG. 11 is a circuit diagram showing another configuration example of the power supply circuit in the cartridge memory CM1 according to another embodiment of the present technology. Hereinafter, configurations differing from those in FIG. 6 will be mainly described, configurations similar to those in FIG. 6 will be denoted by similar reference symbols, and description thereof will be omitted or simplified.

The cartridge memory CM1 according to this embodiment has a different configuration of the power monitoring unit 50. In this embodiment, the current adjustment element 53 is connected between the output terminal and a ground terminal GND of the rectification circuit 43.

Even with such a configuration, the magnitude of the output voltage Vz of the rectification circuit 43 can be adjusted by variably controlling the resistance value of the current adjustment element 53 on the basis of the difference signal Xs.

Although the embodiments of the present technology have been described above, it goes without saying that the present technology is not limited to the above-described embodiments and various modifications can be made.

For example, in the above-mentioned embodiments, the cartridge memory mounted on the magnetic tape cartridge of the LTO standard has been described as an example, but the present technology is not limited thereto and is applicable also to a cartridge memory for a magnetic tape cartridge of another standard other than LTO.

Further, the present technology is applicable also to an information recording medium other than the magnetic tape, e.g., optical discs, magneto-optical discs, semiconductor memories, or cartridge memories for portable hard disc drives.

Further, the present technology is not limited to the cartridge memory mounted on the information recording cartridge, and the present technology is applicable also to commuter passes, entrance/exit control cards for expressways or buildings, as well as ID tags attached to electronic apparatuses, vehicles, robots, logistics products, book collections, and the like. In accordance with the present technology, since the resonant capacitance can be automatically optimized as described above, it is possible to secure a stable communication operation regardless of the communication range with a reader/writer.

It should be noted that the present technology may take the following configurations.

(1) A non-contact communication medium, including:
a memory unit that stores predetermined management information;
a power generation unit that includes a resonant circuit and a rectification circuit, and generates electric power to be supplied to the memory unit, the resonant circuit including an antenna coil and resonant capacitance unit having a variable capacitance value, the rectification circuit rectifying a resonant output of the resonant circuit;
a power monitoring unit that includes a current adjustment element, a reference voltage generation source, and an operational amplifier, the current adjustment element being connected to an input side or an output side of the rectification circuit and being capable of adjusting an output voltage of the rectification circuit, the reference voltage generation source generating a reference voltage, the operational amplifier controlling the current adjustment element such that the output voltage of the rectification circuit is equal to the reference voltage; and
a capacitance control unit configured to control the resonant capacitance unit on a basis of an output of the operational amplifier.

(2) The non-contact communication medium according to (1) above, in which
the current adjustment element is connected in parallel to the resonant circuit on an input side of the rectification circuit.

(3) The non-contact communication medium according to (1) above, in which
the current adjustment element is connected between an output terminal of the rectification circuit and a ground terminal.

(4) The non-contact communication medium according to any one of (1) to (3) above, in which
the capacitance control unit is configured to set the resonant capacitance unit to a capacitance value at which the output voltage of the rectification circuit is maximized.

(5) The non-contact communication medium according to (4) above, in which
the capacitance control unit includes a comparator that compares outputs of the operational amplifier before and after adjustment of the capacitance value.

(6) The non-contact communication medium according to (5) above, in which
the capacitance control unit further includes a storage capacitance capable of holding an output of the comparator as a reference value, and a switch provided between an output terminal of the comparator and the storage capacitance, and
the comparator may be configured to be capable of switching between a first state and a second state, the switch being closed to charge the storage capacitance in the first state, the switch being opened to compare the output of the operational amplifier with the reference value in the second state.

(7) The non-contact communication medium according to any one of (4) to (6) above, in which
the capacitance control unit is configured to set, where a change amount of the output of the operational amplifier before and after adjustment of the capacitance value is zero, the resonant capacitance unit to a capacitance value at which a resonant output of the resonant circuit decreases by a predetermined amount or more.

(8) A recording medium cartridge, including:
an information recording medium;
a cartridge case that houses the information recording medium; and
a non-contact communication medium that includes
a memory unit that stores predetermined management information regarding the information recording medium,
a power generation unit that includes a resonant circuit and a rectification circuit, and generates electric power to be supplied to the memory unit, the resonant circuit including an antenna coil and resonant capacitance unit having a variable capacitance value, the rectification circuit rectifying a resonant output of the resonant circuit,
a power monitoring unit that includes a current adjustment element, a reference voltage generation source, and an operational amplifier, the current adjustment element being connected in parallel to an input side or an output side of the rectification circuit and being capable of adjusting an output voltage of the rectification circuit, the reference voltage generation source generating a reference voltage, the operational amplifier controlling the current adjustment element such that the output voltage of the rectification circuit is equal to the reference voltage, and
a capacitance control unit configured to control the resonant capacitance unit on the basis of an output of the operational amplifier, and
is housed in the cartridge case.

(9) The recording medium cartridge according to (8) above, in which
the information recording medium is a magnetic tape.

(10) A method of driving a non-contact communication medium, including:
obtaining an output voltage of a rectification circuit that rectifies a resonant output of a resonant circuit including an antenna coil and a resonant capacitance;
controlling a resistance value of a current adjustment element that is connected to an input side or an output side of the resonant circuit and is capable of adjusting the output voltage of the rectification circuit such that the output voltage of the rectification circuit is equal to a predetermined reference voltage;
controlling a capacitance value of the resonant capacitance such that the output voltage of the amplification circuit is maximized; and
reading/writing information from/to a memory unit.

REFERENCE SIGNS LIST 11 cartridge case
12 magnetic tape
32 antenna coil
40 power generation unit
42 resonant capacitance unit
43 rectification circuit
45 resonant circuit
50 power monitoring unit
52 operational amplifier
53 current adjustment element
60 capacitance control unit
61 relative comparison circuit
62 control circuit
73 memory unit/logic unit
100 tape cartridge
610 comparator 611 storage capacitance
612 switch
CM,CM1 cartridge memory

The invention claimed is:

1. A non-contact communication medium, comprising:
a memory configured to store predetermined management information;
a power generation circuit configured to include a resonant circuit and a rectification circuit, and generate electric power to be supplied to the memory, the resonant circuit including an antenna coil and a resonant capacitance circuit having a variable capacitance value, the rectification circuit rectifying a resonant output of the resonant circuit;
a power monitoring circuit configured to include a current adjustment element, a reference voltage generation source, and an operational amplifier, the current adjustment element being connected to an input side or an output side of the rectification circuit and being configured to adjust an output voltage of the rectification circuit, the reference voltage generation source generating a reference voltage, the operational amplifier controlling the current adjustment element such that the output voltage of the rectification circuit is equal to the reference voltage; and
a capacitance control circuit configured to control the resonant capacitance circuit on a basis of an output of the operational amplifier.

2. The non-contact communication medium according to claim 1, wherein the current adjustment element is connected in parallel to the resonant circuit on an input side of the rectification circuit.

3. The non-contact communication medium according to claim 1, wherein the current adjustment element is connected between an output terminal of the rectification circuit and a ground terminal.

4. The non-contact communication medium according to claim 1, wherein the capacitance control circuit is configured to set the resonant capacitance circuit to a capacitance value at which the output voltage of the rectification circuit is maximized.

5. The non-contact communication medium according to claim 4, wherein the capacitance control circuit includes a comparator that compares outputs of the operational amplifier before and after adjustment of the capacitance value.

6. The non-contact communication medium according to claim 5, wherein the capacitance control circuit further includes a storage capacitance configured to hold an output of the comparator as a reference value, and a switch provided between an output terminal of the comparator and the storage capacitance, and the comparator is configured to switch between a first state and a second state, the switch being closed to charge the storage capacitance in the first state, the switch being opened to compare the output of the operational amplifier with the reference value in the second state.

7. The non-contact communication medium according to claim 4, wherein the capacitance control circuit is configured to set, where a change amount of the output of the operational amplifier before and after adjustment of the capacitance value is zero, the resonant capacitance circuit to a capacitance value at which a resonant output of the resonant circuit decreases by a predetermined amount or more.

8. A recording medium cartridge, comprising:
an information recording medium;
a cartridge case that houses the information recording medium; and
a non-contact communication medium that includes
a memory configured to store predetermined management information regarding the information recording medium,
a power generation circuit configured to include a resonant circuit and a rectification circuit, and generate electric power to be supplied to the memory, the resonant circuit including an antenna coil and resonant capacitance circuit having a variable capacitance value, the rectification circuit rectifying a resonant output of the resonant circuit,
a power monitoring circuit configured to include a current adjustment element, a reference voltage generation source, and an operational amplifier, the current adjustment element being connected in parallel to an input side or an output side of the rectification circuit and being configured to adjust an output voltage of the rectification circuit, the reference voltage generation source generating a reference voltage, the operational amplifier controlling the current adjustment element such that the output voltage of the rectification circuit is equal to the reference voltage, and
a capacitance control circuit configured to control the resonant capacitance circuit on the basis of an output of the operational amplifier, and
is housed in the cartridge case.

9. The recording medium cartridge according to claim 8, wherein the information recording medium is a magnetic tape.

10. The recording medium cartridge according to claim 8, wherein the current adjustment element is connected in parallel to the resonant circuit on an input side of the rectification circuit.

11. The recording medium cartridge according to claim 8, wherein the current adjustment element is connected between an output terminal of the rectification circuit and a ground terminal.

12. The recording medium cartridge according to claim 8, wherein the capacitance control circuit is configured to set the resonant capacitance circuit to a capacitance value at which the output voltage of the rectification circuit is maximized.

13. The recording medium cartridge according to claim 12, wherein the capacitance control circuit includes a comparator that compares outputs of the operational amplifier before and after adjustment of the capacitance value.

14. The recording medium cartridge according to claim 13, wherein the capacitance control circuit further includes a storage capacitance configured to hold an output of the comparator as a reference value, and a switch provided between an output terminal of the comparator and the storage capacitance, and the comparator is configured to switch between a first state and a second state, the switch being closed to charge the storage capacitance in the first state, the switch being opened to compare the output of the operational amplifier with the reference value in the second state.

15. The recording medium cartridge according to claim 12, wherein the capacitance control circuit is configured to set, where a change amount of the output of the operational amplifier before and after adjustment of the capacitance value is zero, the resonant capacitance circuit to a capacitance value at which a resonant output of the resonant circuit decreases by a predetermined amount or more.

* * * * *